United States Patent

[11] 3,590,286

| [72] | Inventors | Richard A. Becker<br>Fayetteville, Ark.;<br>Paul R. Hill, Castro Valley, Calif.; Robert<br>R. Hobson, San Jose, Calif. |
|---|---|---|
| [21] | Appl. No. | 784,988 |
| [22] | Filed | Nov. 21, 1968 |
| [45] | Patented | June 29, 1971 |
| [73] | Assignee | The United States of America as represented by the United States Atomic Energy Commission |

[54] THERMIONIC CONVERTER CELLS FOR NUCLEAR REACTOR
7 Claims, 3 Drawing Figs.

[52] U.S. Cl.  ............................................. 310/4,
176/39, 165/105
[51] Int. Cl. ............................................. H02n 3/00
[50] Field of Search ............................................. 176/39;
165/105; 310/4

[56] References Cited
UNITED STATES PATENTS

| 3,243,613 | 3/1966 | Grover | 310/4 |
| 3,302,042 | 1/1967 | Grover et al. | 176/39 X |
| 3,509,386 | 4/1970 | Byrd | 310/4 |

*Primary Examiner*—Reuben Epstein
*Attorney*—Roland A. Anderson

ABSTRACT: An improved thermionic converter cell is provided for use with a cylindrical fuel ring space power reactor. The collector of a conventional converter cell is modified to enclose a vapor chamber condenser which carries the generated heat through a beryllium oxide reflector to an external heat sink. The combination of beryllium oxide as the reflector material and vapor chamber condensers provides a radial neutron reflector which has both good nuclear properties and high effective thermal conductivity.

INVENTORS.
Richard A. Becker
Paul R. Hill
Robert R. Hobson
ATTORNEY.

INVENTORS.
Richard A. Becker
Paul R. Hill
BY Robert R. Hobson

ATTORNEY.

THERMIONIC CONVERTER CELLS FOR NUCLEAR REACTOR

BACKGROUND OF THE INVENTION

This invention relates to a nuclear reactor system which is capable of converting heat generated by nuclear fission directly to electrical energy by employing thermionic emission and more specifically to an improved thermionic converter cell for generating electrical energy while transferring heat from an unmoderated reactor core to an external sink in such a manner as to increase performance and reduce the system weight.

Extended missions in near and deep space will require long-lived reliable electrical power sources. Presently the most promising power source is the nuclear thermionic power system. This system is simple, completely static, and lends itself to compact design. One particularly compact reactor design has been presented in copending application Ser. No. 467,821, filed June 22, 1965, entitled "Nuclear Reactor" by the same assignee. Briefly, the reactor is composed of a cylindrical pipelike unmoderated reactor core with planar thermionic diodes mounted on the reactor surface. Heat generated in the reactor core is transferred by conduction to the diodes where a portion of the heat is converted directly to electricity and the remainder is radiated as waste heat to space from the radiator surface of the diodes. The reactor is built in a building block form with rings of fuel-converter assemblies. The fuel rings are split in half along a plane passing through the axis of the rings to allow reactor startup and shutdown through movement of the two halves. Normally, the thermionic diodes of the converter cell are disposed about the periphery of the fuel rings so that the emitters are integrally fastened to the fuel ring in order to provide a short heat transfer path to the emitter, reference being made to another copending application Ser. No. 467,822, filed June 22, 1965, entitled "Nuclear Reactor and Thermionic Converter Cells Therefor" by the same assignee. As disclosed, each diode is individually sealed with its own plasma reservoir. The plasma reservoir communicates with an envelope formed in the spacing between the diode emitter and collector. The collector is made of neutron reflector material to reduce neutron leakage. This concept has no circulating coolants or associated power generating dynamic machinery and, thereby, eliminates potential wear problems. This simplicity and the redundancy of power producing modules have the potential for very long-lived reliability.

In the above-described power reactor the collectors are made of substantial portions of molybdenum to provide the best balance between nuclear reflection properties and thermal conductivity. This trade-off between reflector properties and thermal conductivity is further limited in that weight must be conserved when applying a power source of this nature to space vehicles. Further structural connections and seals for the cesium chamber must be very carefully designed because of the various stresses which are present due to the extreme collector temperatures. Thus, a means is needed which would improve the radial thermal conductivity and improve the nuclear properties so that system electrical performance could be improved by reducing the collector temperature and at the same time reduce the overall weight of the system.

SUMMARY OF THE INVENTION

This invention is an improved system for overcoming the above-described limitations of the cylindrical space power reactor and has as its primary object to provide an improved thermionic converter cell for space reactor application.

Further, it is an object of the present invention to provide an electrical power source which provides improved electrical performance at lower operating temperatures and reduced system weight.

Yet another object of the present invention is to provide a thermionic converter cell with substantially improved neutron reflecting.

Briefly, the present invention provides a thermionic power source which utilizes vapor chamber condensers in combination with a beryllium oxide reflector to provide collector cooling and substantial system weight reduction. The improved thermionic converters are disposed about the periphery of an unmoderated cylindrical reactor core with the emitters of each diode being integrally fastened to a corresponding fuel ring in such a manner as to provide maximum heat transfer from the core to the emitters. Each diode is individually sealed with its own cesium reservoir in fluid communication with a cesium vapor envelope formed between the emitter and collector spacing, The vapor chamber condenser is formed within the collector with a vaporization plenum adjacent the collecting surface of the collector and a condensation plenum including a thermal radiator surface external of the reflector surface. The plenums are connected by means of a supply tube. In this manner the reflector structure is relieved of the requirement of thermal conduction of the reactor fission generated heat to a radial thermal reflector. Since the vapor chamber condenser has excellent heat transfer properties the greater portion of waste heat is transmitted through the condenser to the external thermal reflector surface. Thus, improved neutron reflecting and weight combination are achieved by using a lighter, more efficient neutron reflector material such as beryllium oxide.

Other objects and many of the attendant advantages of the present invention will be readily evident from the following description when taken in conjunction with the accompanying drawings, wherein like reference numerals refer to corresponding parts throughout the drawings.

DETAILED DESCRIPTION OF THE PREFERRED EMBODIMENTS

In the art, the operation of vapor chamber condensers, sometimes referred to as "heat pipes," as heat conductors is well known. Briefly, the "heat pipes" is a heat transfer device comprising a container, a condensable vapor heat transfer medium disposed in the container, and a capillary means disposed within the container capable of causing the condensed vapor to flow from a cooler area or condenser region of the container to a hotter or vaporization region of the container. The transfer of the vapor through the container uses, as the driving force, the difference in vapor pressures in the vaporization region and the condenser region. The liquid which condenses in the condenser region is returned to the vaporization region by capillary action. The condensate collects in the interior surface wicking or grooving (small channels cut in the interior surface of the container) and flows back to the vaporization region. Thus, fluid circulation is established in the pipe with the vapor formed by heating the vaporization region flowing to the condenser region where it is condensed through release of heat to a heat exchanger in thermal contact with the condenser region. By means of this circulation a closed cycle heat transfer device is created to extract heat from the heated region of the "pipe" and transmit it to the nonheated end of the "pipe." These devices transfer heat with a minimal temperature drop. Therefore, an essentially uniform temperature distribution is established along the entire "pipe" surface. For a more detailed discussion of the "heat pipe" see Grover, Cotter, and Erickson, "Structure of Very High Thermal Cpnductance," 35 Journal of Applied Physics, 1990, (June 1964).

Figure 1:
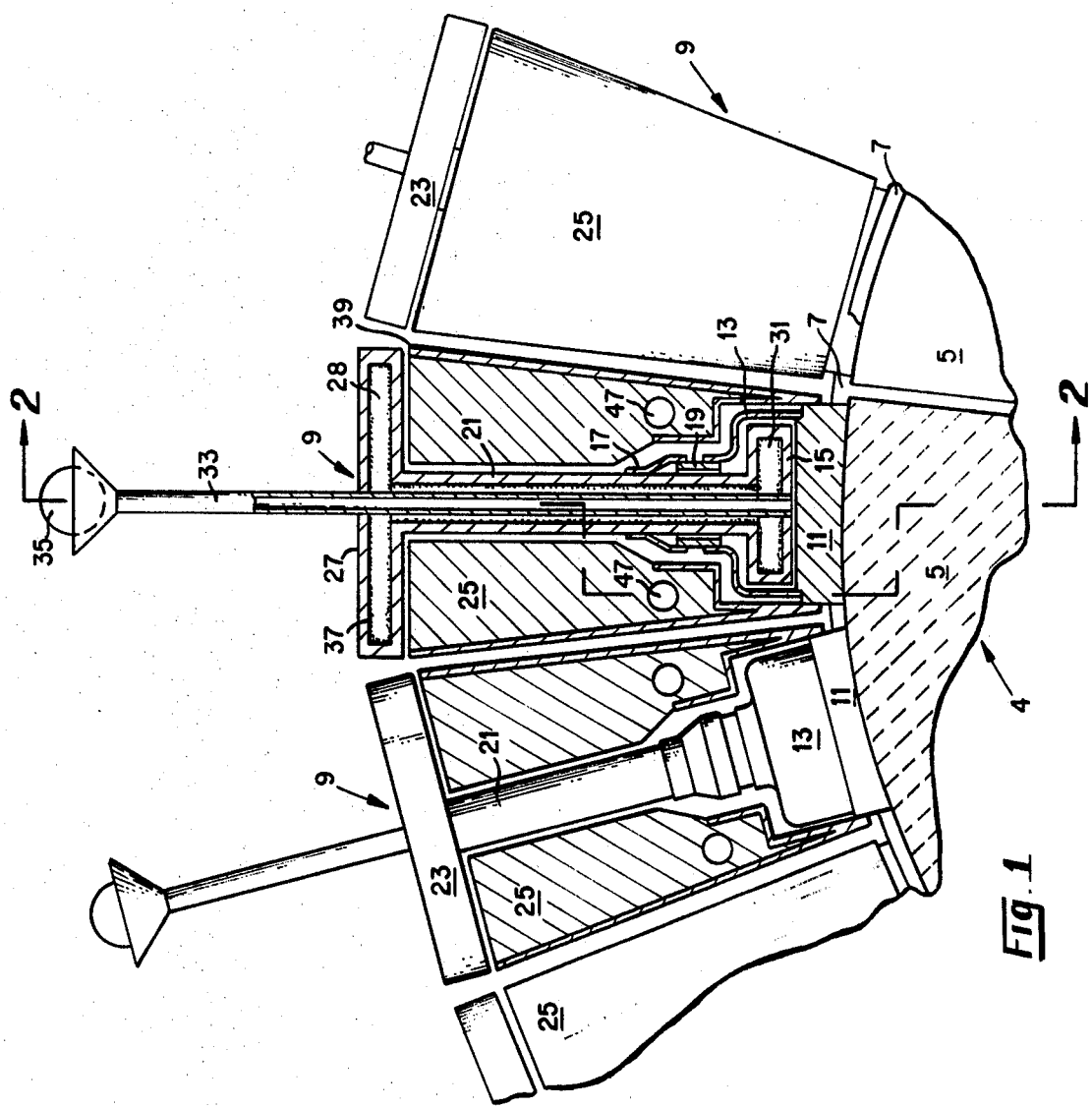
FIG. 1 is a cross-sectional view of a nuclear reactor showing the improved thermionic converter cell of the present invention shown mounted on a reactor fuel ring.

Referring now to FIG. 1, there is shown a cross-sectional view on one layer of converter elements according to the subject invention. As pointed out above, the reactor configuration with which the present invention is used to improve the performance thereof consists of a central cylindrical core 4. The core is constructed in a building block form consisting of annular segments. The segments are mounted together and arranged to form fuel half rings which are disposed for longitudinal separation to provide reactivity control. For a complete description of the reactor control mechanism reference is made to copending application Ser. No. 467,821, cited above. The fuel segments are composed of a matrix of uranium dioxide and tungsten cermet and are clad by tungsten in the preferred embodiments but, of course, other refractory-type reactor fuels could be used. The core 4 preferably consists of an array of 18 rigidly stacked fuel rings supported at each end in a manner to be discussed later.

Still referring to FIG. 1, the core 4 is divided in annular segments 5 and surrounded by converter mounting rings 7. These rings provide the mounting structure for the thermionic diodes 9, the main structure for a fuel half ring, the heat transfer path from the fuel to the emitters 11 of diodes 9, and the mounting surface for the fuel segments. The emitter 11 of each diode 9 is bonded to the appropriate fuel segment 5 and the adjacent mounting rings 7 in a conventional manner, as by welding, in order to provide a good heat conduction path from the fuel to the emitter. By bonding each emitter in a single ring to the periphery of the adjacent mounting rings all the emitters of one ring are connected in parallel electrically. A cylindrical plasma envelope 13 encloses the collector 15 and a portion of the emitter 11 in a gastight seal and has an outwardly extending neck portion 17 which is connected to the cylindrical envelope 13 by means of an electrical insulating, alumina sleeve 19 so that the entire area is gastight sealed and the emitter is electrically insulated from the collector. The extreme outward end of the neck portion of the envelope is connected by a gastight weld to a tubular member 21 which has its inward end connected to the collector structure. The converter envelope provides containment of plasma, preferably cesium vapor, over the face of the emitter and around the collector. The envelope also provides structural support for the collector 15 to maintain the collector at a predetermined spacing from the emitter. Further, the envelope provides structural support for the vapor chamber condenser 23. The vapor chamber condenser transports the heat through the relatively thick beryllium oxide neutron reflector 25. The vapor chamber condenser consists of an outer radiator surface 27 which forms the outer wall of a condensation plenum chamber 28. The condensation plenum is provided to distribute the heat uniformly over the radiator surface 27. A vaporization plenum chamber 31 is enclosed by the collector 15 structure and cools the collector while transferring excess heat from the core area to the external radiator surface through tubular member 21. Member 21 interconnects the plenums and preferably is made concentric with the cesium vapor supply stem 33 which provides fluid communication between the cesium envelope 13 and a cesium supply reservoir 35. The vapor chamber condenser is sealed at the reflector surface and at the collector surface where the cesium stem 33 extends therethrough in order to provide a vaportight sealed chamber. The inner walls of the vapor chamber condenser 23 are lined with a wicking material or capillary grooves 37 to provide the capillary action discussed above. Due to the small size of the converters, the capillary grooves are preferred since the wicking has been noted to separate from the walls of the vapor chamber, causing hot spots. These grooves extend over the entire inner surface of the vapor chamber condenser and are cut so that their depth is twice their width in order to provide proper capillary action. Although a number of condensable vapors may be used in the vapor chamber condensers, certain metals such as cesium, potassium, sodium, and lithium have been found to be most desirable at the reactor operating temperatures involved. These metals in their liquid states have the desired properties of (1) high latent heat of vaporization, (2) high thermal conductivity, (3) low viscosity, (4) high surface tension, (5) wetting ability, and (6) suitable boiling point. The walls of the vapor chamber condenser may be made of stainless steel or hiobium—1 per cent zirconium depending upon the metal vapor used.

Figure 2:
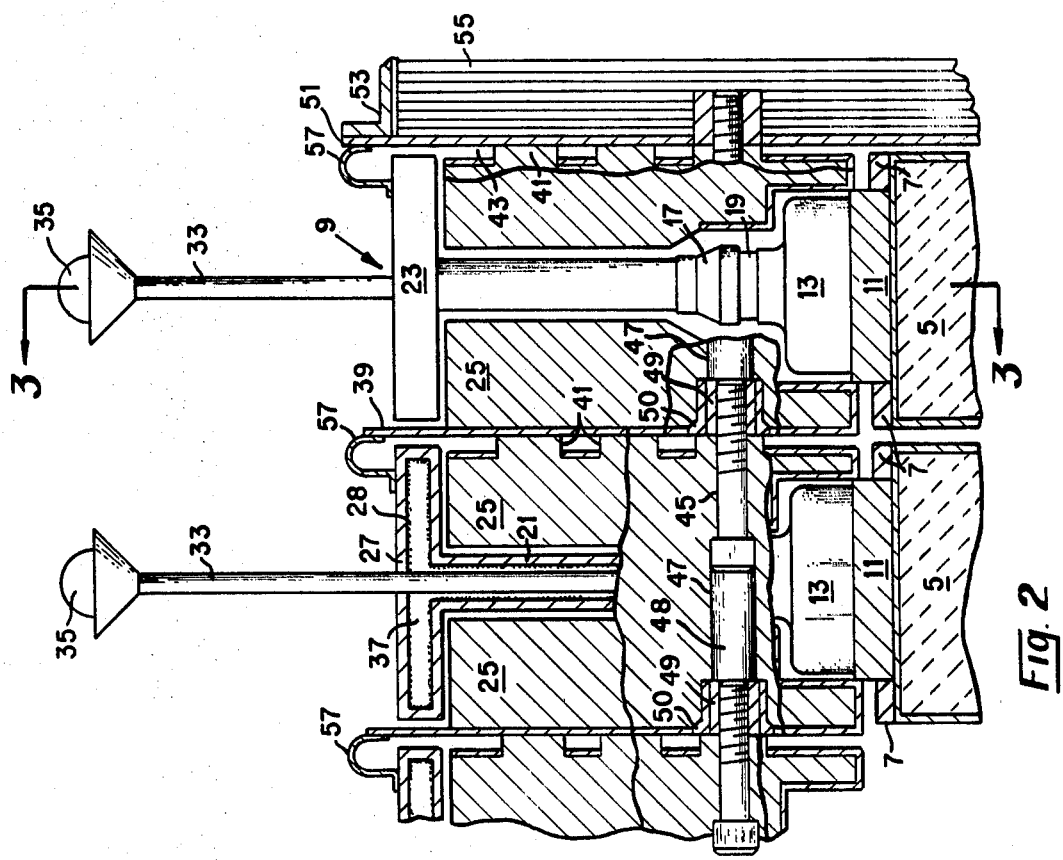
FIG. 2 is a longitudinal cross-sectional view of the diodes of FIG. 1 showing the reactor end mounting reflector and the converter cell electrical connections.

Referring now to FIG. 2, there is shown a longitudinal cross-sectional view of the diodes showing the electrical connection between adjacent rings. Each reflector 25 is clad with an electrically conductive metal 39 to provide an electrical lead for the emitters. Each reflector clad 39 is connected to its corresponding emitter 11 and partially encloses the reflector 25. Since the reflector material, such as beryllia or alumina, is an electrical insulator as well as a nuclear reflector, each diode is provided with spacer buttons 41 of the reflector material which protrude through the reflector clad 39 to maintain the proper insulating gap 43 between the rings of converter cells. The reflectors 25 are held in place by tie bolts 45 which are inserted into apertures 47 and screwed into threaded inserts 49 disposed in aperture 47 in the reflector of the adjacent ring of the diodes. Electrical insulator-spacer 48 is inserted in aperture 47 and locked in place by inserts 49 which are self-locking into the reflector clad bosses 50. In the case of the end ring of cells, the bolts 45 are screwed into mounting plates 51 which are rigidly attached to thermal expansion and mounting legs 53 located around the end heat shields 55.

To provide the desired voltage output of the converter cell, the diodes of adjacent rings are electrically connected in series and thus the number of rings determine the output voltage. This is accomplished by the reflector clads 39 being connected to their emitters 11 and then having jumper 57 connected from the reflector clads 39 on one converter cell to the radiators 27 of the converters mounted on the next adjacent ring. Since the radiators 27 are electrically integral with the collectors 15, the emitters are effectively connected to the collectors of the adjacent ring. The jumpers 57 from the radiators on the first ring are attached to the adjacent mounting plate 51 to provide one external electrode while the reflector clad 39 of the last ring (not shown) is connected to provide the other external electrode. By using the building block approach, it is easily seen that the number of converter cells may be varied to meet the particular power requirements, and further various electrical connections other than that described could be used to satisfy a particular voltage or current demand.

As shown in FIG. 1, three converter cells are mounted at the periphery of one fuel segment 5. In the preferred fuel segment arrangement there are 8 fuel segments in one complete ring of the reactor. These rings are divided into half rings for control by separation, as pointed out above. Thus, there are preferably 12 converter cells paralleled on each half ring.

Figure 3:
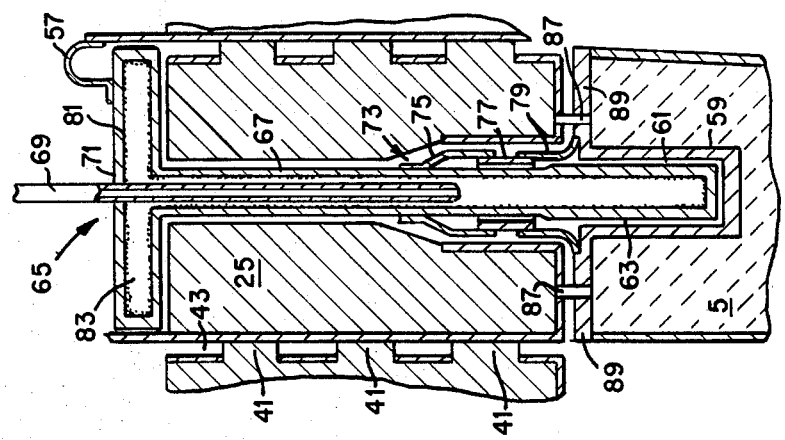
FIG. 3 is a cross-sectional view of an alternate embodiment of the DETAILED thermionic converter cell according to the present invention.

Referring now to FIG. 3, there is shown an alternative embodiment of a thermionic diode which is vapor chamber condenser cooled and has its emitter and collector embedded in the fuel segment 5. This diode is electrically connected and supported as discussed above for the surface mounted diode and, therefore, for reason of simplicity, only one of the cells is shown with its associated fuel segment 5. As shown, the converter is formed by a cylindrical well 59 in the fuel segment 5. The emitter surface 61 is formed by a cylindrical clad inserted in the well 59. The collector surface 63 is formed on the outer surface of the vaporization portion of a vapor chamber condenser 65. As in the surface mounted converter cell, vapor chamber condenser supply tube 67 is concentric with the cesium vapor supply stem 69 which enters the radiator surface 71 of condenser 65 and extends inward of the reactor through supply tube 67 and comes out through the side of the supply tube at a point to provide fluid communication with a vaportight supporting envelope 73. As in the embodiment described above, the envelope is formed of an upper cylindrical portion 75 having its outward end connected to supply tube 67 and the inward end connected to an electrical insulating sleeve 77 which connects further to an inward cylindrical enclosure 79.

Enclosure 79 is connected to the emitter 61 at the opening of well 59. The vaportight sealed envelope provides the plasma enclosure for the area between the emitter and collector spacing. The vapor chamber condenser wicking or grooving 81 provides the capillary action necessary for the proper vapor flow to extract excess heat from collector 63, thus providing the necessary cooling. The vapor flows outward toward the radiator surface 71 transmitting the heat therewith to a condensing plenum chamber 83 where the vapor distributes heat over the radiator surface 71 to be radiated to space as the vapor is condensed to liquid and flows by means of capillary action through the grooving back to the vaporization region in the area of the collector 63.

The vapor chamber supply tube 67 is surrounded with a beryllium reflector material 25 as in the case of the surface mounted diode and is electrically connected and mounted in place in a manner similar to that of the surface mounted cell. Since the emitter surface is embedded and does not touch the reflector clad, the reflector clad is electrically connected to its corresponding emitter 61 by means of conductive mounting studs 87 provided between the emitter 61 and mounting rings 89.

In operation, both of the disclosed converter elements function in a similar manner; therefore, an explanation of the operation of one is believed to be sufficient for a complete understanding of the operation. Heat from fission in the fuel segments 5 is applied to the emitter of the diode. Heat applied to the emitter causes electrons to be boiled off of the emitter surface to the collector, aided by the positive ion plasma in the space between the emitter and collector. Heat is also transmitted across the gap to the collector 15 which in turn heats the metal within the vapor chamber condenser. The metal is liquefied and saturates the grooving 37 starting the heat transfer action of the vapor chamber condenser from the collector 15 to the radiator surface 27. The radiator radiates heat to space thus providing cooling for the collector and extracting excess heat from the reactor core. Since the vapor chamber condensers are capable of transferring large quantities of heat over considerable distances with very small temperature gradients, the collector temperature can be maintained at a lower level for the same inside fuel temperature thereby improving the efficiency of the converter. The collector can be maintained at a temperature of 1200° to 1300° K, while the emitter is at 2000° to 2200° K and the fuel temperature is at approximately 2500° K. By eliminating the need for heat transfer to the outside radiator surface through the reflector material, the necessary thickness and weight of the reflector can be limited to neutron reflector and shielding demands without comprising for heat transmission through the reflector material. Therefore, the reflectors can be made lighter to conserve weight.

While the invention has been described specifically with reference to particular embodiments thereof, it will be understood that numerous other embodiments are possible and that various changes and modifications may be made without departing from the scope of the following claims.

What we claim: claim is:

1. In a thermionic converter cell for a nuclear unmoderated reactor having an elongated cylindrical core, a plurality of plasma diodes juxtaposedly mounted around the periphery of said core, each of said diodes having an emitter connected to said core, a collector, a reservoir for a positive ion plasma and a gastight supporting envelope connected in fluid communication with said plasma reservoir for supporting said collector in a fixed spatial relationship with the electron emitting surface of said emitter and containing the plasma between the collector and emitter spacing, the improvement comprising: a vapor chamber condenser having a condensable vapor disposed therein, said vapor chamber condenser having a condenser end mounted outward of said reactor the outer surface of which forms a thermal radiator surface, a vaporization end the outer surface of which forms said collector and a tubular member interconnecting the ends of said vapor chamber condenser for fluid communication therebetween supported by said plasma envelope, said vapor chamber condenser being composed of an electrically conductive material, an electrically conductive clad neutron reflector surrounding said tubular member for providing radial neutron reflection and shielding, said reflector being electrically connected to said emitter, means for mounting said reflectors in a stacked array about said core, and means for electrically interconnecting said diodes in a predetermined order to provide a desired output voltage.

2. A thermionic converter cell as set forth in claim 1 wherein said neutron reflectors are composed of beryllia and said electrically conductive clad is molybdenum.

3. A thermionic converter cell as set forth in claim 1 wherein said condenser end of said vapor chamber condenser includes a condensation plenum chamber which extends over the outward surface of said reflector, said plenum having a flat outer heat radiator surface over which heat transmitted from the vaporization end of the vapor chamber is distributed to be radiated to space.

4. A thermionic converter cell as set forth in claim 3 wherein said vaporization end of said vapor chamber condenser is a cylindrical vaporization plenum chamber the outer surface of the inward end of which forms said collector, wherein waste heat from the collector surface vaporizes said working medium causing said vaporized working medium to be transmitted through said tubular member to said condensation plenum chamber for removing excess heat from said collector electrode.

5. A thermionic converter cell as set forth in claim 4 wherein said vapor chamber condensers are composed of niobium—1 per cent zirconium and the condensable vapor is sodium.

6. A thermionic converter cell as set forth in claim 4 wherein each of said diodes includes a hollow cylindrical emitter embedded in said reactor core, a hollow cylindrical collector having its inward end enclosed and disposed in a fixed spatial relationship with said cylindrical emitter, said inner chamber of said collector forming said vaporization end of said vapor chamber condenser thereby allowing said vapor chamber condenser to remove excess heat from said collector.

7. A thermionic converter cell as set forth in claim 1 wherein said reactor core includes a plurality of stacked annular segments, each of said segments having at least one diode mounted thereon, said annular segments being divided into annular half rings, an electrically conductive mounting ring surrounding each of said annular rings, each of said diodes of said half rings having their emitters connected to respective mounting rings thereby connecting each of said emitters of each annular ring in electrical parallel, and means connecting each emitter of each diode in an annular half ring to the collector of each diode in an adjacent half ring and means connecting the emitters of a first ring to a first output terminal and means connecting the collectors of a last half ring to a second output terminal.